(12) United States Patent
Yuan

(10) Patent No.: US 9,075,570 B2
(45) Date of Patent: Jul. 7, 2015

(54) PROTECTIVE CASE WITH HEAT DISSIPATION STRUCTURE FOR ELECTRONIC PRODUCTS

(71) Applicant: Luhui Yuan, Shenzen (CN)

(72) Inventor: Luhui Yuan, Shenzen (CN)

(*) Notice: Subject to any disclaimer, the term of this patent is extended or adjusted under 35 U.S.C. 154(b) by 223 days.

(21) Appl. No.: 13/954,283

(22) Filed: Jul. 30, 2013

(65) Prior Publication Data

US 2015/0036291 A1    Feb. 5, 2015

(51) Int. Cl.
*H05K 7/20* (2006.01)
*G06F 1/16* (2006.01)
*G06F 1/20* (2006.01)

(52) U.S. Cl.
CPC ...... *G06F 1/1628* (2013.01); *G06F 2200/1633* (2013.01); *G06F 2200/20* (2013.01)

(58) Field of Classification Search
CPC ............. G06F 1/20; G06F 1/203; G06F 1/16; H05K 7/20; H05K 5/00; F28F 9/00; B65D 85/00; B31B 1/90
USPC ............. 361/679.01, 679.02, 679.03, 679.09, 361/679.46, 679.54, 679.55, 679.56, 361/690–694, 704, 700–7, 714; 165/80.2, 165/80.3, 80.4, 104.33, 185; 174/50, 50.54, 174/520; 312/223.1, 223.2, 223.3, 236, 312/265; 206/37, 320, 472, 702, 818
See application file for complete search history.

(56) References Cited

U.S. PATENT DOCUMENTS

| | | | | |
|---|---|---|---|---|
| 7,729,108 | B2* | 6/2010 | Rehmann et al. | 361/679.09 |
| 8,479,915 | B2* | 7/2013 | Chen | 206/320 |
| 2012/0037285 | A1* | 2/2012 | Diebel et al. | 150/165 |
| 2012/0155020 | A1* | 6/2012 | Nishi | 361/679.55 |
| 2013/0235521 | A1* | 9/2013 | Burch et al. | 361/679.48 |
| 2014/0000844 | A1* | 1/2014 | Chandaria | 165/80.2 |
| 2014/0110083 | A1* | 4/2014 | Cheng | 165/47 |

* cited by examiner

*Primary Examiner* — Michail V Datskovskiy
(74) *Attorney, Agent, or Firm* — Garcia-Zamor IP Law; Ruy M. Garcia-Zamor

(57) ABSTRACT

A protective case with multiple air tunnels for the protective case, so the heat absorbed by contact blocks from the electronic equipment is radiated rapidly out of the protective case through vent pipes. When the electronic equipment is supported up to watch movie or play games, because the hot air will raise and be exhausted from the upper part, and the fresh cool air will come inside from lower part of the protective case, as a result, the ventilation is accelerated and the heat dissipation performance is greatly improved.

6 Claims, 3 Drawing Sheets

PROTECTIVE CASE WITH HEAT DISSIPATION STRUCTURE FOR ELECTRONIC PRODUCTS

TECHNICAL FIELD

The present invention relates to a protective case for electronic products, specifically to a simple practical protective case with heat dissipation structure for electronic products.

BACKGROUND ART

Along with development and cost reduction of the touch-screen technology, the electronic equipment like tablet touch-screen mobile and PC becomes more and more popular. And the protective case used to protect the electronic equipment comes into being.

At present, the common protective case for electronic products on the market includes protective case for mobile and protective case for tablet PC, which do not have heat dissipation structure. However, the functions of the electronic equipment become more and more powerful, the heat dissipation problems become increasingly prominent, and use of the protective case will always lower the heat dissipation performance of the electronic products.

SUMMARY OF THE INVENTION

In order to solve the above problem, the present invention claims a protective case that is simple in structure, durable and high in production efficiency, with heat dissipation structure for electronic products.

The technical proposal of the present invention is as follows:

A protective case with heat dissipation structure for electronic products, comprising a base case and a frame, wherein a plurality of contact blocks that are in contact with the electronic equipment are distributed at inner side of the base case, and the contact blocks are in communication with each other through vent pipes; the four sides of the frame are provided with vent holes, and the contact blocks on the base case are in communication with the vent holes on the frame through the vent pipes; the height of each contact block is not smaller than that of the vent pipes. The arrangement of vent holes and vent pipes forms multiple air tunnels for the protective case, so the heat absorbed by the contact blocks from the electronic equipment is radiated rapidly out of the protective case through the vent pipes. When the electronic equipment is supported up to watch movie or play games, because the hot air will raise and be exhausted from the upper part, and the fresh cool air will come inside from lower part of the protective case, as a result, the ventilation is accelerated and the heat dissipation performance is greatly improved.

The base case is fully distributed with the contact blocks and vent pipes in cellular shape.

The contact blocks are orthohexagonal. The cellular arrangement makes the fabrication easier and the make the structure more stable.

The vent pipes on the base case are in communication with each other.

The frame is of a hollow double-layer structure, and the vent holes at inner side of the frame are in communication with the vent pipes. The hollow frame facilitates quick air exhaustion and prevents problems that ventilation is bad because some of the vent holes are blocked.

The frame is provided with vent holes at the bottom surface, and the bottom surface of the base case is provided with bumps higher than the vent holes at bottom surface of the frame, so the vent holes will not be blocked.

The beneficial effect of the present invention is that the heat can be dissipated rapidly from the protective case because of arrangement of the vent holes and vent pipes.

Figure 1:
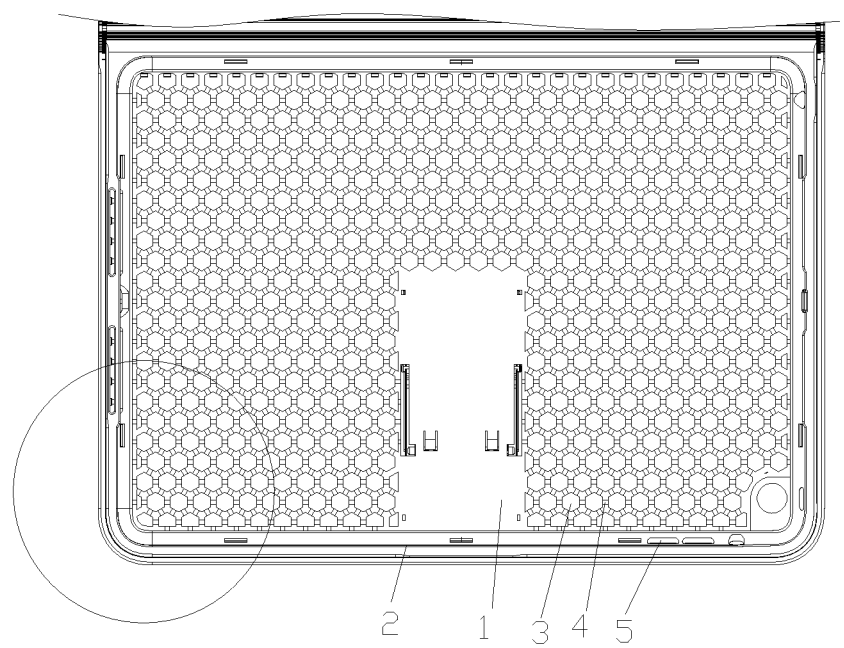
FIG. 1 is the structure diagram of the embodiment of the present invention.
Figure 2:
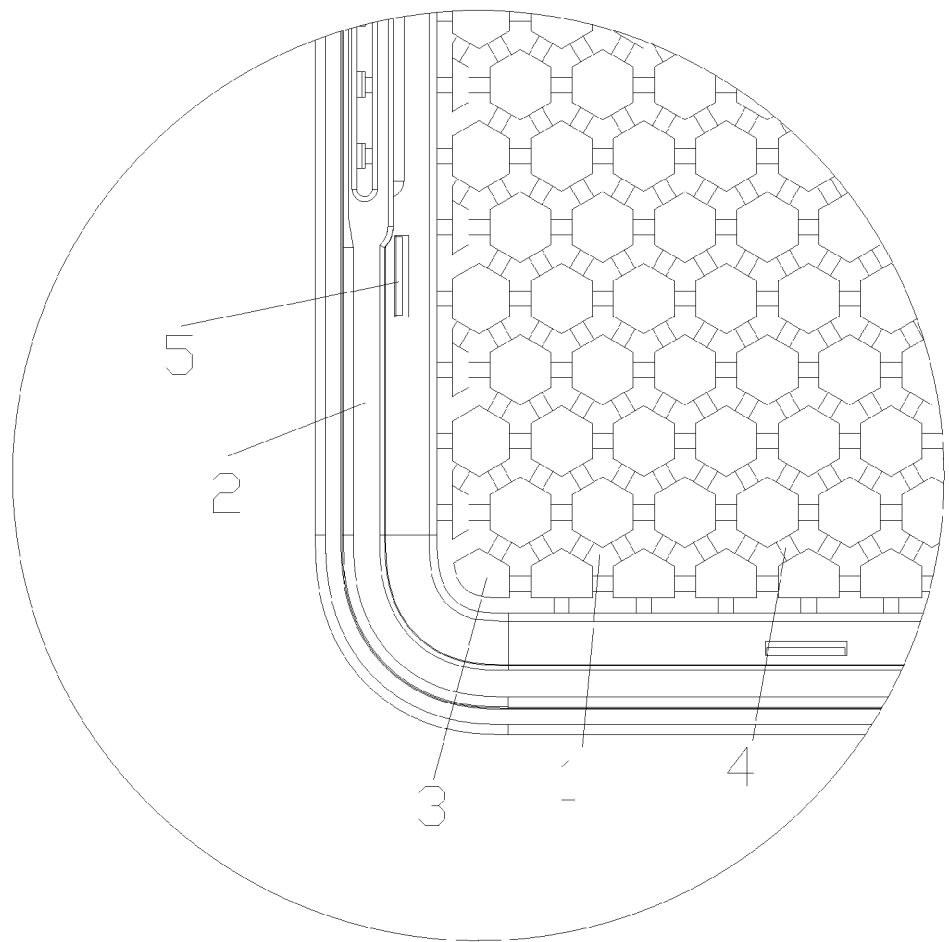
FIGS. 2 and 3 are partial enlarged drawings of the embodiment of the present invention.
Figure 3:
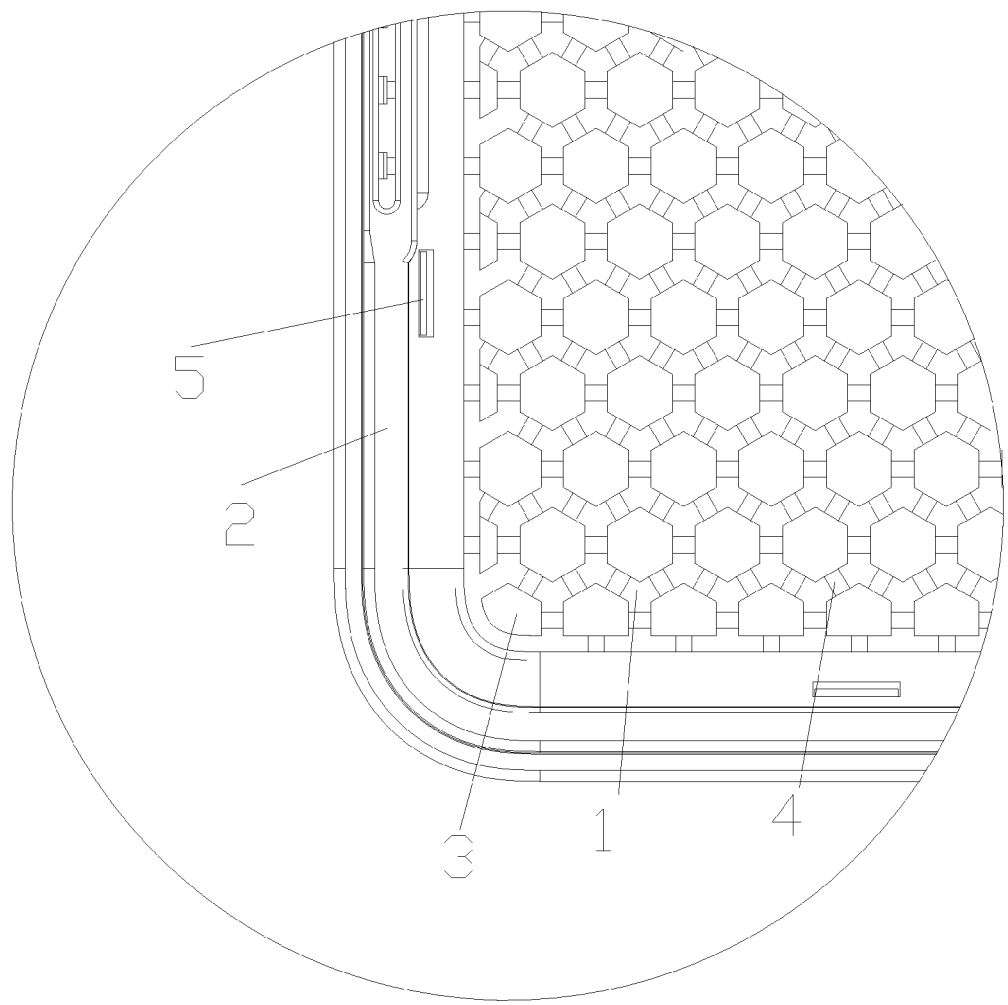

wherein, 1 refers to Base case, 2 refers to Frame, 3 refers to Contact block, 4 refers to Vent pipe and 5 refers to Vent hole.

DETAILED DESCRIPTION OF THE PREFERRED EMBODIMENTS

The following description is the embodiment of the present invention. It should be pointed out that the embodiment does not limit the present invention.

As shown in the Figure: A protective case with heat dissipation structure for electronic products, comprising a base case 1 and a frame 2, wherein a plurality of contact blocks 3 that are in contact with the electronic equipment are distributed at inner side of the base case 1, and the contact blocks 3 are in communication with each other through vent pipes 4; the four sides of the frame 2 are provided with vent holes 5, and the contact blocks 3 on the base case 1 are in communication with the vent holes 5 on the frame through the vent pipes 4; the height of each contact block 3 is not smaller than that of the vent pipes 4. The arrangement of vent holes 5 and vent pipes 4 forms multiple air tunnels for the protective case, so the heat absorbed by the contact blocks 3 from the electronic equipment is radiated rapidly out of the protective case through the vent pipes 4. When the electronic equipment is supported up to watch movie or play games, because the hot air will raise and be exhausted from the upper part, and the fresh cool air will come inside from lower part of the protective case, as a result, the ventilation is accelerated and the heat dissipation performance is greatly improved.

The base case 1 is fully distributed with the contact blocks 3 and vent pipes 4 in cellular shape.

The contact blocks 3 are orthohexagonal, and the cellular arrangement makes the fabrication easier and the make the structure more stable.

The vent pipes 4 on the base case 1 are in communication with each other.

The frame 2 is of a hollow double-layer structure, and the vent holes 5 at inner side of the frame 2 are in communication with the vent pipes 4. The hollow frame 2 facilitates quick air exhaustion and prevents problems that ventilation is bad because some of the vent holes are blocked.

The frame 2 is provided with vent holes 5 at the bottom surface, and the bottom surface of the base case 1 is provided with bumps higher than the vent holes 5 at bottom surface of the frame 2 at bottom surface of the frame, so the vent holes 5 will not be blocked.

The beneficial effect of the present invention is that the heat can be dissipated rapidly from the protective case because of arrangement of the vent holes and vent pipes.

Obviously, the above content is only description of the character of the present invention but not to restrict the present invention. Any changes to the present invention by common technician of the related technical field are in the protection scope of the present invention.

What is claimed is:

1. A protective case with heat dissipation structure for electronic products, comprising a base case and a frame, wherein a plurality of contact blocks that are in contact with the electronic equipment are distributed at inner side of the base case, and the contact blocks are in communication with each other through vent pipes; the four sides of the frame are provided with vent holes, and the contact blocks on the base case are in communication with the vent holes on the frame through the vent pipes; the height of each contact block is not smaller than that of the vent pipes.

2. The protective case with heat dissipation structure for electronic products according to claim 1, wherein the base case is fully distributed with the contact blocks and vent pipes in cellular shape.

3. The protective case with heat dissipation structure for electronic products according to claim 1, wherein the contact blocks are orthohexagonal.

4. The protective case with heat dissipation structure for electronic products according to claim 1, wherein the vent pipes on the base case are in communication with each other.

5. The protective case with heat dissipation structure for electronic products according to claim 1, wherein the frame is of a hollow double-layer structure, and the vent holes at inner side of the frame are in communication with the vent pipes.

6. The protective case with heat dissipation structure for electronic products according to claim 1, wherein the frame is provided with vent holes at the bottom surface, and the bottom surface of the base case is provided with bumps higher than the vent holes.

* * * * *